United States Patent
Brassfield et al.

(10) Patent No.: US 7,235,958 B2
(45) Date of Patent: Jun. 26, 2007

(54) APPARATUS AND METHOD TO SYNCHRONIZE SWITCHING FREQUENCIES OF MULTIPLE POWER REGULATORS

(75) Inventors: Joel Nathan Brassfield, Westmont, IL (US); Joseph Gerard Renauer, Naperville, IL (US)

(73) Assignee: Texas Instruments Incorporated, Dallas, TX (US)

( * ) Notice: Subject to any disclaimer, the term of this patent is extended or adjusted under 35 U.S.C. 154(b) by 104 days.

(21) Appl. No.: 11/132,068

(22) Filed: May 18, 2005

(65) Prior Publication Data

US 2006/0261798 A1    Nov. 23, 2006

(51) Int. Cl.
*G05F 1/56* (2006.01)
(52) U.S. Cl. .................. 323/282; 323/267; 323/272
(58) Field of Classification Search ............. 323/267, 323/272, 282, 350, 351
See application file for complete search history.

(56) References Cited

U.S. PATENT DOCUMENTS

| 6,911,808 B1 * | 6/2005 | Shimamori ............. 323/283 |
| 6,922,043 B2 * | 7/2005 | Manabe et al. ........... 323/283 |
| 7,075,279 B2 * | 7/2006 | Manabe et al. ........... 323/283 |

* cited by examiner

*Primary Examiner*—Jeffrey Sterrett
(74) *Attorney, Agent, or Firm*—Wade J. Brady, III; Frederick J. Telecky, Jr.

(57) ABSTRACT

A power supply has a plurality of switching regulators providing a like plurality of regulated output voltages. The oscillators of the switching regulators are synchronized with one another by a synchronization signal. A synchronization signal detector is provided on one or more of the switching regulators to shift the switching frequency of the oscillator to a lower frequency upon detection of a synchronization signal.

18 Claims, 5 Drawing Sheets

APPARATUS AND METHOD TO SYNCHRONIZE SWITCHING FREQUENCIES OF MULTIPLE POWER REGULATORS

BACKGROUND OF THE INVENTION

1. Field of the Invention

The present invention relates generally to an electrical power supply and in particular to an apparatus and method for synchronizing switching frequencies of multiple power regulators.

2. Description of the Related Art

Power regulators are used in many electrical devices to provide controlled power to the circuits in the device. The power regulators may be used to translate the voltage to a desired level, to regulate the power to a particular output level, or the like. Power regulators are configured according to several different designs. One such design is a switching power regulator, where an input voltage is switched on and off rapidly and the resulting signal is smoothed to provide an output voltage at a lower level. In many systems, multiple regulators are used to provide multiple output voltages at different levels.

A power regulator 24 is shown generally in FIG. 1, including an input 10, a power conversion stage 12, and an output 14. The power conversion stage 12 has an output 16 that is fed through a feedback network 18 to an error amplifier 20 that in turn feeds a controller 22 which controls the power conversion stage 12.

The controller block 22 of the power regulator 24 is shown generally in FIG. 2, including an oscillator 28, a ramp generator 30, and a pulse width modulator 32. The oscillator 28 operating frequency is determined by a frequency setting component 34 that is typically external to the controller 22. The oscillator block 28 may, optionally, include a synchronization input (sync input) 36 that forces the oscillator operating frequency to match the frequency of the sync signal. In the absence of an external sync signal, the oscillator 28 runs at the frequency determined by its frequency setting component 34. This frequency is commonly called the "free running frequency".

The principal function of the oscillator 28 is to provide the timing signals to generate a ramp signal, such as generated by the ramp generator 30, that is a required input to a pulse width modulator, such as the pulse width modulator 32. The ramp signal is generally a saw-tooth shape with a linear rise to a peak value and an abrupt decrease back to a minimum value. The frequency of the ramp signal is equal to the frequency of the oscillator output. The period of one cycle of the ramp waveform, T, is equal to $1/f_{osc}$, where $f_{osc}$ is the oscillator operating frequency.

In many systems, multiple power regulators are used. Due to manufacturing tolerances, otherwise identical regulators operate at slightly different free running frequencies. The ramp waveforms of three regulators operating at slightly different frequencies are shown in a graph 40 in FIG. 3. The graph 40 is actually several graphs positioned above one another so as to facilitate comparison of timing of the illustrated signals. The horizontal axis represents common time for all the signals and the vertical axis indicates voltage level for each signal but the voltage levels are not common as between the signals and instead are shifted vertically with respect to one another.

In FIG. 3, a Ramp 1 signal, referenced 42, is from the lowest frequency oscillator and has a waveform duration period designated as $T_{SLOW}$. A Ramp 2 signal, referenced 44, is from an oscillator running at a desired nominal frequency. The period of the Ramp 2 signal 44 is designated by $T_{NOM}$. The Ramp 3 signal 46 is from the highest frequency oscillator. The period of the Ramp 3 signal 46 is designated by $T_{FAST}$. As shown, these three waveforms 42, 44 and 46 represent three regulators that are running asynchronously. In particular, the periods of the three signals are compared and shown to differ in duration as indicated by the arrows. The switching frequencies of these three regulators are unrelated.

In systems with multiple switching regulators running asynchronously, undesirable beat frequencies are generated that occur at the sum and difference frequencies of the multiple oscillator frequencies. These beat frequencies represent undesirable noise that is injected in to the electrical system. In an effort to eliminate the generation of beat frequencies, some regulators support the option of synchronizing their oscillators to an external synchronization signal. This forces all regulators to run at the same frequency.

One known method of synchronization of oscillators exhibits some undesirable restrictions and side effects. These side effects are illustrated in the graph 48 of FIG. 4. In FIG. 4 is shown a common horizontal time axis for four signals and a vertical axis that is not common for the four signals but instead has been shifted to permit comparison of the signals. The same three regulator signals shown in FIG. 3 are now supplied a synchronization signal labeled Sync Pulse and referenced 50. The period of the Sync Pulse signal 50 is equal to $T_{NOM}$, the same as the period of the Ramp 2 signal 44. In most synchronization circuits, the rising edge of the sync signal causes the ramp signal to immediately return to its minimum value and begin a new rising interval. In FIG. 4, the Ramp 1 signal 42, which represents the lowest free running operating frequency, behaves as expected. When a sync pulse 52 occurs in the sync pulse signal 50, the current ramp is terminated and the next cycle begins. The period of the Ramp 1 signal 42 is now equal to the period of the Sync Pulse signal 50. In similar fashion, the Ramp 2 signal 44, which represents the nominal free running frequency, is also locked to the Sync Pulse period $T_{NOM}$. The Ramp 3 signal 46a, which represents the highest free running frequency, exhibits an unusual behavior, however. Since it is running at a higher frequency than the Sync Pulse signal 50, its oscillator completes its normal ramp cycle and starts another cycle before the next pulse 52 of the Sync Pulse signal 50 arrives. When the pulse 52 of the Sync Pulse signal 50 arrives at the oscillator of the Ramp 3 signal 46a, it causes a termination of the ramp cycle that is in progress and forces a new ramp cycle to start. This produces a corrupted ramp waveform as shown at 46a that will cause improper operation of the pulse width modulator 32. To resolve this issue, the known circuits require that the frequency of the synchronizing signal must be equal to or higher than the highest free running frequency of the oscillators to be synchronized. This is an undesirable restriction that can cause other adverse side effects.

SUMMARY OF THE INVENTION

The present invention provides a method and apparatus to enable synchronization of multiple switched power regulators with one another. In particular, a control input is provided to cause a decrease in an oscillation frequency of the switching oscillator upon a synchronization signal being present. The decrease in oscillation frequency shifts a switched regulator ramp signal that may be higher in frequency than a synchronization pulse to a frequency lower than the synchronization pulse so as to permit control of the corresponding switched regulator by the synchronization pulse.

DETAILED DESCRIPTION OF THE PREFERRED EMBODIMENTS

Figure 1:
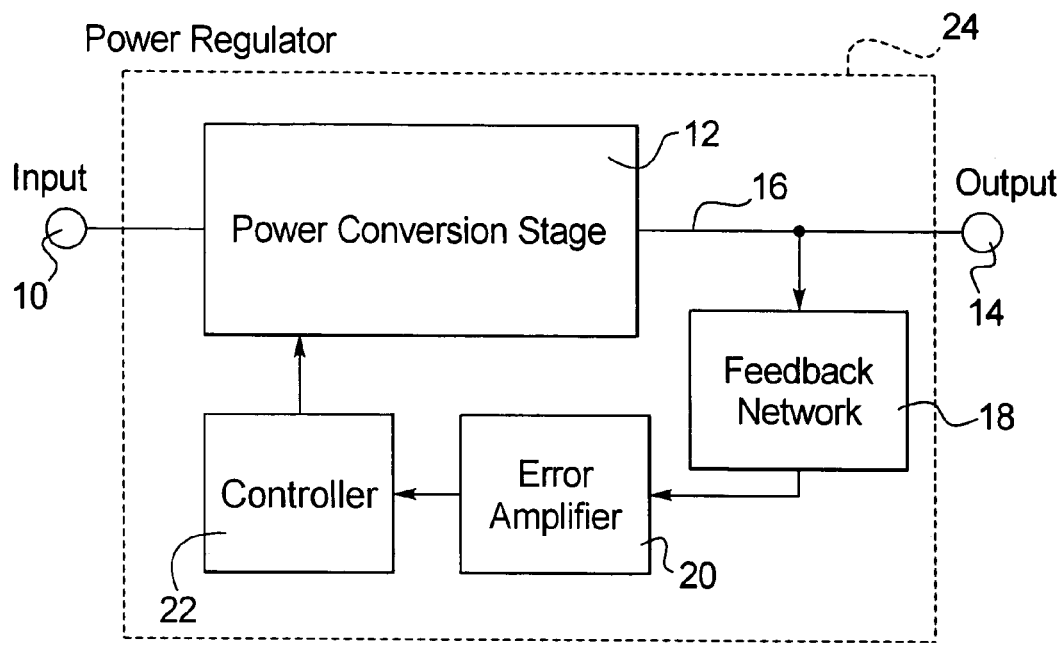
FIG. 1 is a functional block diagram of a power regulator of a known construction.

The present method and apparatus enables the signals of multiple power regulators to be synchronized with one another. Applying the principles of the present invention to the example discussed in the introductory portions of this specification, the ramp signals 42, 44 and 46 of the three regulators are synchronized with one another. In particular, in FIG. 5, the Ramp 1 signal 42, the Ramp 2 signal 44 and the Ramp 3 signal 46 are shown along a common time line in a graph 54 but with the signals shifted to permit comparison. The Sync Pulse signal 50 is also shown.

Figure 5:
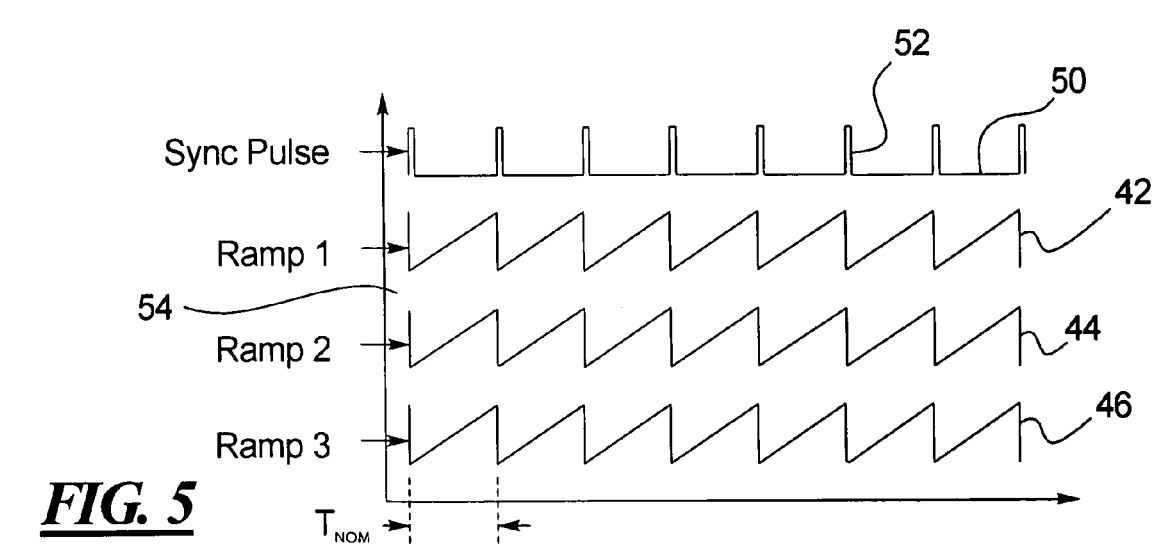
FIG. 5 is a graph showing signals of power regulators after application of the present invention.

As is apparent from a review of waveforms in FIG. 5, after the present invention is utilized, the operation of the same three power regulators is synchronized to a common signal period $T_{NOM}$. All three regulator signals 42, 44 and 46, including the regulator signal 46 with the highest free running frequency, are now synchronized to the Sync Pulse signal 50. All of the ramp signals exhibit the correct shape for proper operation of the pulse width modulator, such as the pulse width modulator 32.

Figure 2:
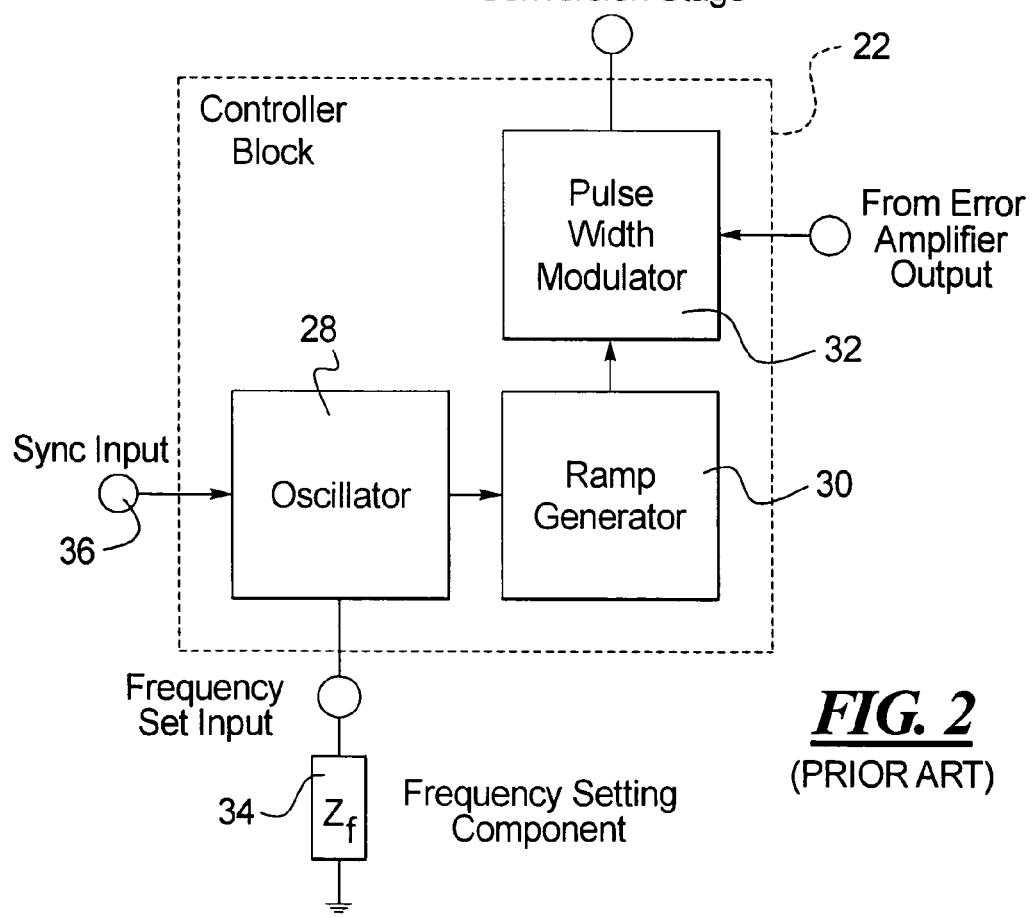
FIG. 2 is a functional block diagram of a controller portion of a power regulator of a known construction.
Figure 3:
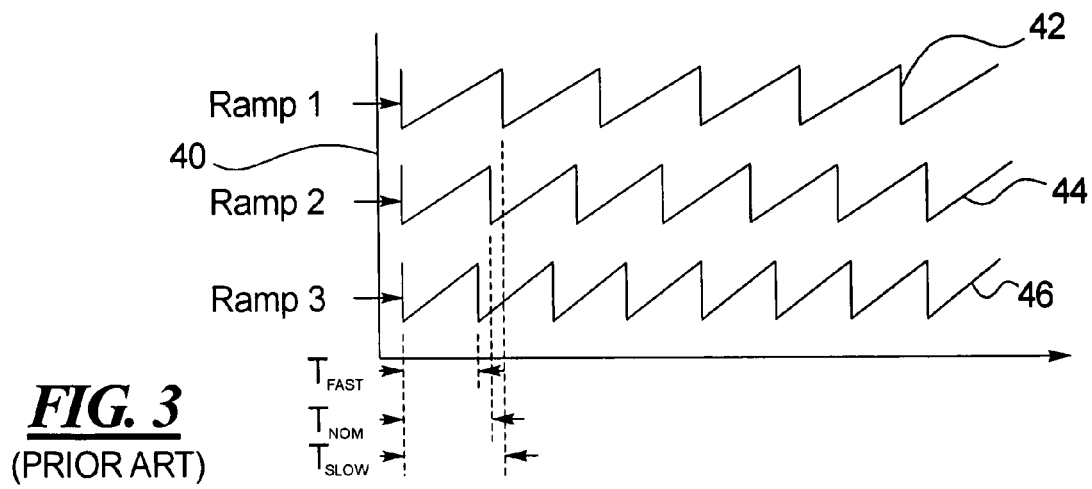
FIG. 3 is a graph comparing signals from three power regulators.
Figure 4:
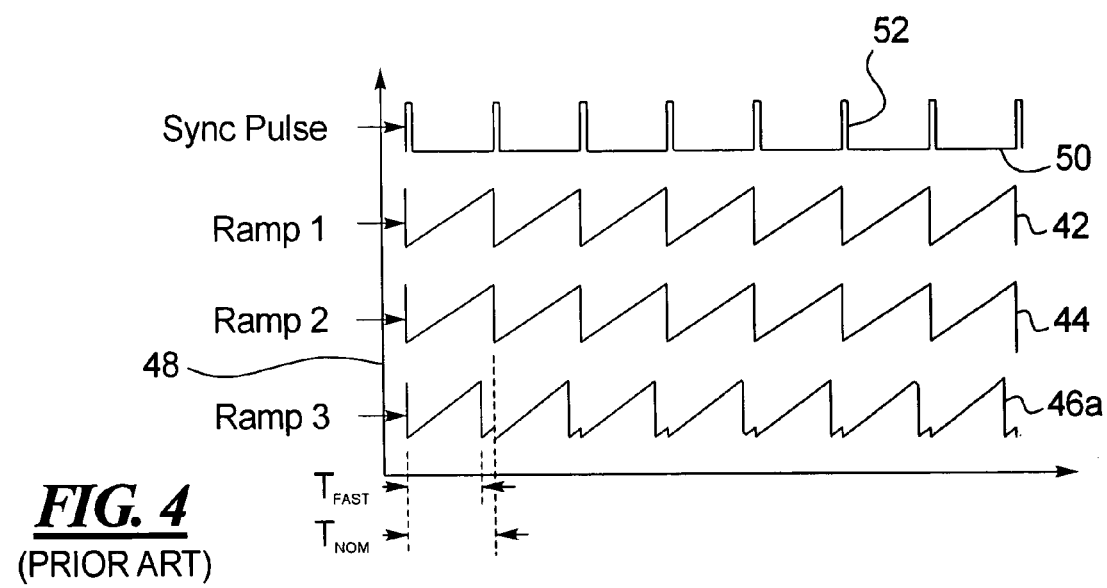
FIG. 4 is a graph of a known method of synchronizing the signals of multiple power regulators.
Figure 6:
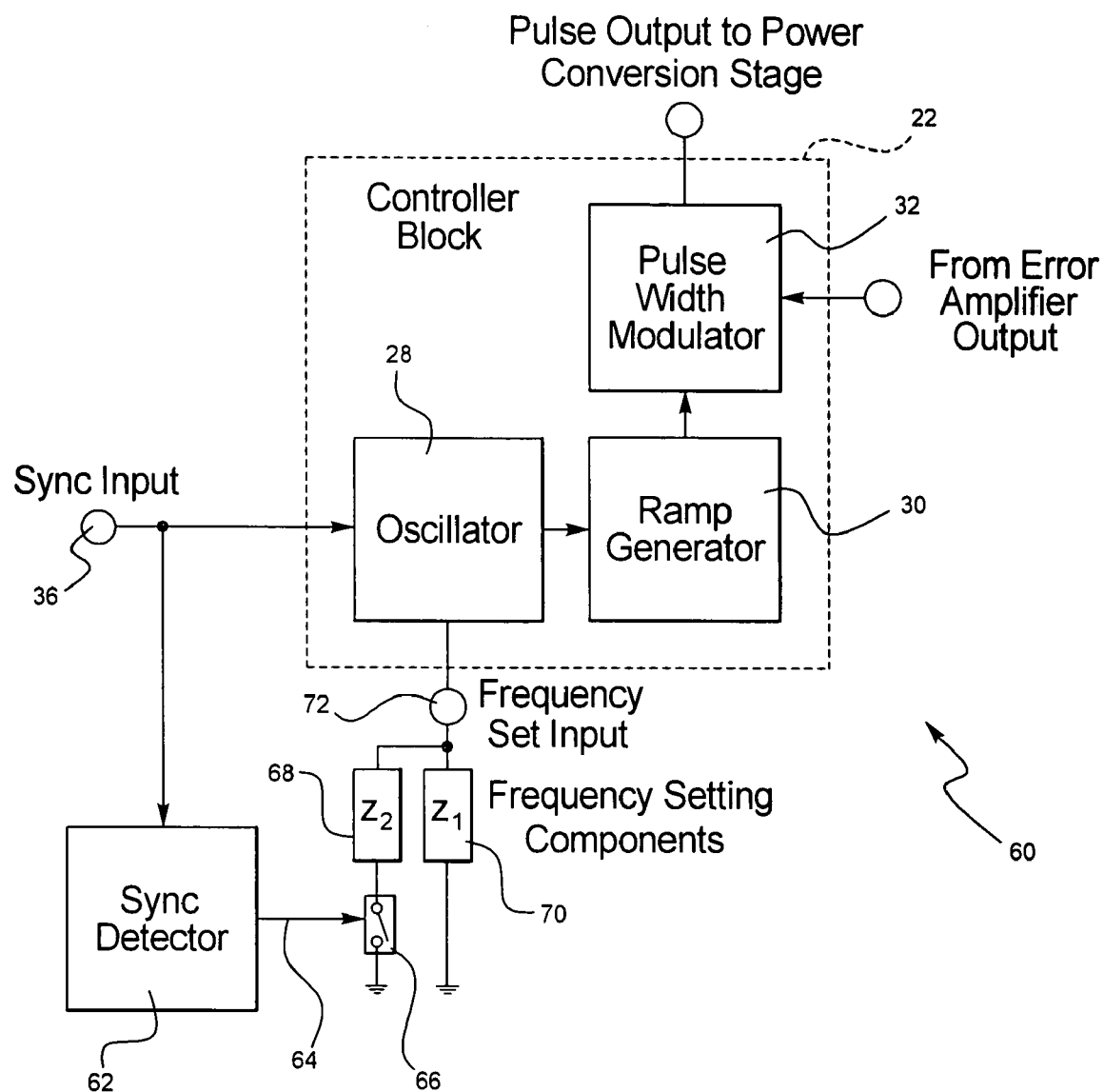
FIG. 6 is a functional block diagram of a power regulator according to the principles of the present invention.

One embodiment of a circuit according to the present invention is shown generally, in block form, in FIG. 6. In the illustrated diagram, the same reference numerals have been applied to the same or similar elements as in FIG. 2. The circuit 60 includes a Sync Detector 62 that receives the same sync input signal 36 that is fed to the oscillator block 28 of the controller 22. The sync detector 62 has an output 64 changes state when it detects the presence of a synchronizing signal. The sync detector output 64 controls some form of electronic switch 66 that connects, or removes, one or more frequency setting components 68 and 70 connected to a frequency set input 72 of the oscillator 28. When the electronic switch 66 is activated, the effective value of the frequency setting components 68 and 70 is altered to lower the free running frequency of the oscillator 28. Lowering the free running frequency of the regulators by a suitable amount insures that all of the regulators exhibit a free running frequency lower than the desired sync frequency.

This insures proper generation of the ramp waveforms. It allows the user or builder to synchronize all of the regulators to a synchronization signal that runs at the nominal expected switching frequency. The regulators are not forced to run at the highest expected frequency.

The circuit of the invention can be embodied in a number of ways. One such embodiment adds the previously described blocks as external circuits that interface with existing power regulator controller integrated circuits. Most of these integrated circuits make use of an external component to set the oscillator free running frequency. This external component in some instances is a resistor. In other instances it is a capacitor. In the case of a resistor-type frequency setting scheme, increasing the value of the resistance at the frequency set input typically lowers the oscillator frequency. In the case of a capacitor-type scheme, increasing the capacitance will lower the oscillator frequency. Depending on the frequency setting method used, it may be necessary to configure the sync detector controlled switch (See FIG. 6) as a normally closed device or a normally open device. It may be necessary to configure the switched frequency setting component, labeled Z2 in FIG. 6 and referenced 68, as an element in series with further component Z1, referenced 70, instead of the parallel configuration shown. The desired action is to change the effective value of the frequency setting elements upon detection of a synchronizing signal so as to lower the free running oscillator frequency. Other configurations are possible and are within the scope of this invention.

Figure 7:
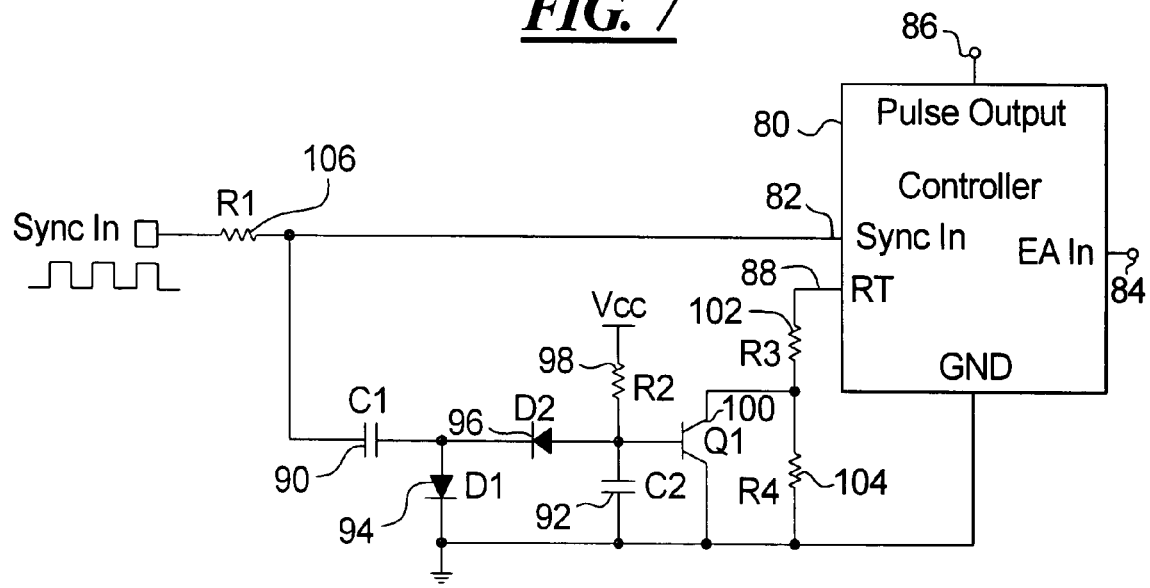
FIG. 7 is a circuit diagram of a controller portion of a power regulator of a first embodiment.

A detailed embodiment of the invention using a controller with a resistive frequency setting element is shown in FIG. 7. Specifically, a controller 80 has a sync in input 82, an input 84 from an error amplifier, and an output 86 to a power conversion stage. A number of components are provided connected to an RT input 88 of the controller 80. These components include a capacitor C1 90, a capacitor C2 92, a diode D1 94, a diode D2 96, and a resistor R2 98. Together, these components act as a sync detector. A transistor Q1 100 acts as a switch with the sync detector connected at the control input. Here, the transistor is a bipolar transistor and the control input is the base. It is also foreseen that other types of transistors, such as a FET, or other types of switches may be provided. Resistors R3 102 and R4 104 are the frequency setting components. A resistor R1 106 is provided at the sync in connection for the circuit.

In this embodiment, in the absence of a sync signal, the transistor Q1 100 is turned on by the power supply voltage $V_{cc}$ across the resistor R2 98 and capacitor C2 92. The capacitor C2 92 charges as a result of the current through the resistor R2 98 to raise the base voltage to the transistor Q1 100 sufficiently to turn on the transistor. The transistor Q1 100 in the on condition effectively shorts out the resistor R4 104, removing its influence on the setting of the oscillator frequency. Under this no-sync-present condition, the frequency of oscillation is determined solely by the value of the resistor R3 102. When a periodic sync signal is applied at the sync in input, the combined action of the sync detector components causes the base voltage to the transistor Q1 100 to go low and the transistor Q1 100 to be switched off. This action effectively places the resistor R3 102 in series with the resistor R4 104. The frequency of oscillation is now determined by the sum of the resistance of the resistor R3 102 and the resistor R4 104. Since this is a larger total resistance than the resistance of the resistor R3 102 alone, the frequency of oscillation is decreased, which was the desired intent.

Figure 8:
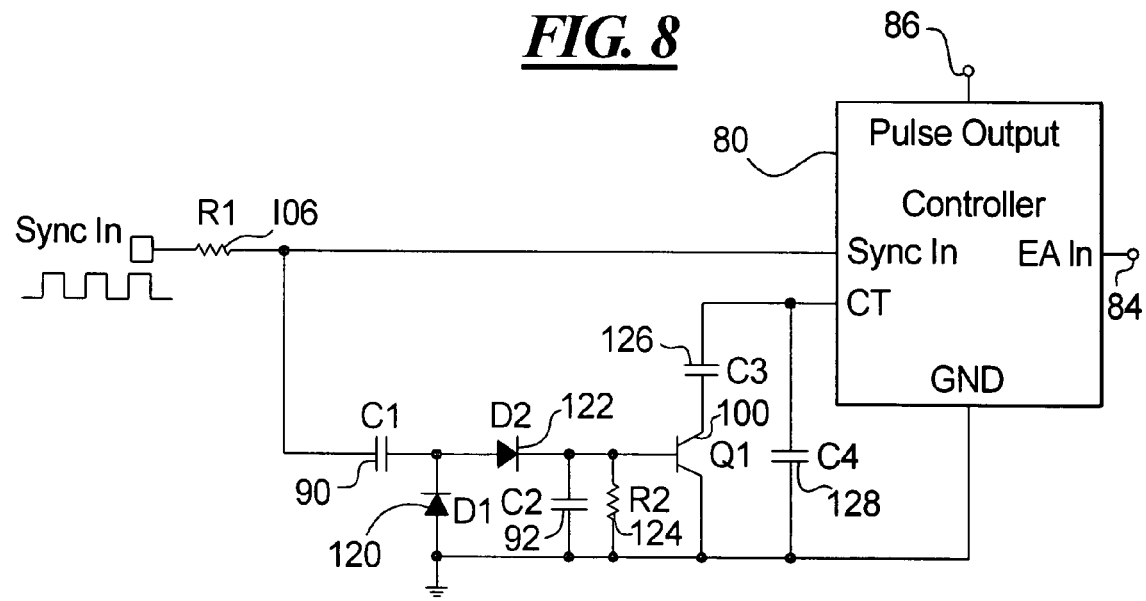
FIG. 8 is a circuit diagram of a controller portion of a power regulator of a second embodiment.

A further embodiment of the invention using a controller with a capacitive frequency setting element is shown in FIG. 8. Where the same or similar elements appear as in FIG. 7, the same reference characters are used. In this embodiment, a sync detector includes the following components: a capacitor C1 90, a capacitor C2 92, a diode D1 120, a diode D2 122, and a resistor R2 124. The transistor Q1 100 acts as a switch. Here, capacitors C3 126 and C4 128 are the frequency setting components. In this embodiment, in the absence of a sync signal, the transistor Q1 100 is turned off. This effectively removes the capacitor C3 126 from the circuit. Under this no-sync-present condition, the frequency of oscillation is determined solely by the value of the capacitor C4 128. When a periodic sync signal is applied, the combined action of the sync detector components causes the transistor Q1 100 to be switched on. This action effectively places the capacitor C3 126 in parallel with the capacitor C4 128. The frequency of oscillation is now determined by the sum of the capacitors C3 126 and C4 128. Since this is a larger total capacitance value than the value of the capacitor C4 128 alone, the frequency of oscillation is decreased, which was the desired intent.

Figure 9:
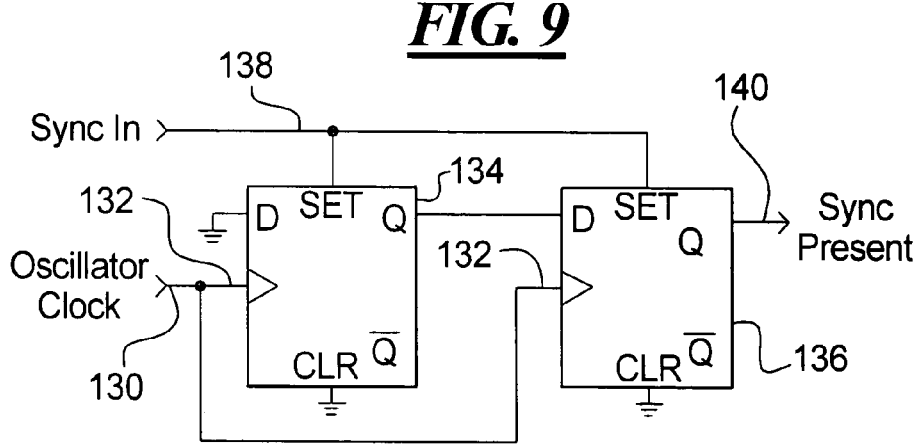
FIG. 9 is a circuit diagram of a sync detection circuit according to a further embodiment of the invention.

The principles of this invention are not limited to external circuits connected to existing controller integrated circuits. The function of sync detection and the shifting of oscillator free running frequency could be incorporated into the controller integrated circuit. In this instance, an embodiment of a sync detection block using digital techniques is shown in FIG. 9. A clock signal 130 from an existing oscillator block is fed to clock inputs 132 of two D flip-flops 134 and 136. In the absence of a sync input signal at a sync input 138, a Sync Present signal 140 will be de-asserted. When a sync input signal 138 is applied, the Sync Present signal 140 will immediately be asserted. When Sync Present signal 140 is asserted, the oscillator block, such as the oscillator 28, is commanded to shift to a lower operating frequency. When the sync input signal 138 is removed, the Sync Present signal 140 will be de-asserted within two clock periods of the oscillator clock.

Figure 10:
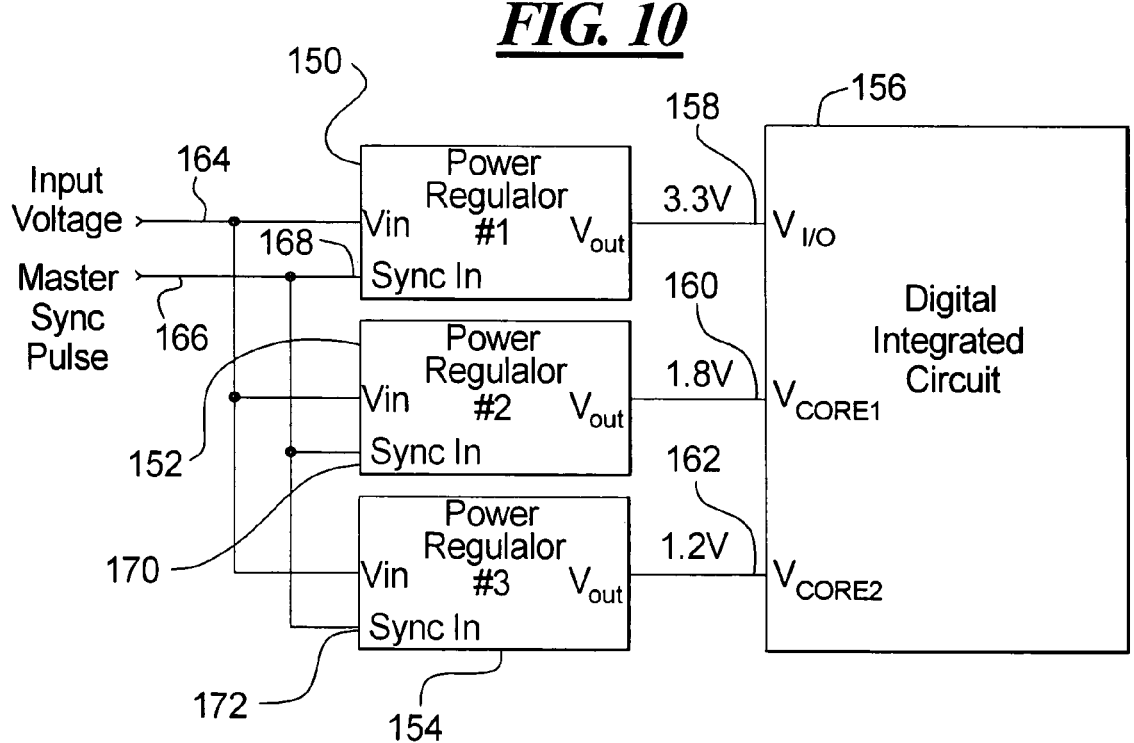
FIG. 10 is a partial circuit diagram of an example power distribution system utilizing the invention.

An example of a power distribution system utilizing the invention is shown in FIG. 10. Three power regulators 150, 152 and 154 according to the invention are shown. The three power regulators 150, 152 and 154 deliver three different voltages required by a digital integrated circuit 156, for example. The integrated circuit 156 could be a microprocessor, a Digital Signal Processor, a programmable gate array, an Application Specific Integrated Circuit (ASIC), or any other high-performance integrated circuit requiring multiple operating voltages. It is also foreseeable that several integrated circuits or non-integrated circuits may be provided with power by the regulators 150, 152 and 154. The power regulator 1, referenced 150, delivers 3.3V to a $V_{I/O}$ supply rail 158 of the integrated circuit 156. The power regulator 2, referenced 152, delivers 1.8V to a $V_{CORE1}$ supply rail 160 of the integrated circuit 156. The power regulator 3, referenced 154, delivers 1.2V to a $V_{CORE2}$ supply rail 162 of the integrated circuit 156. The input power to all three regulators 150, 152 and 154 is supplied from a common source labeled input voltage 164. The switching frequency of all three regulators 150, 152 and 154 is locked to a common master sync pulse 166 which feeds synch in inputs 168, 170 and 172 of each of the three power regulators 150, 152 and 154. The sync in function operates as previously described in FIG. 6. In particular, the synchronization signal is detected and the switching frequency of the regulators is reduced so that the synchronization signal causes all the regulators to operate in synchronization with one another. With all three power regulators 150, 152 and 154 operating at the same frequency, the system noise presented to the digital integrated circuit 156 is minimized.

Thus, there is shown and described several embodiments of a circuit and method for shifting an oscillation frequency of an oscillator in a switched regulator to a lower oscillation frequency so as to permit any fast running regulators to "sync up" with a master synchronization signal.

The present invention is of a scope broad enough to cover various alternatives. For example, the illustrated power supply has three regulators for producing three voltages. It is of course possible to apply this invention to power supplies having more or fewer regulators. The example of FIG. 5 discloses a power supply in which only one of the power regulators require the frequency shift to provide the solutions of the present invention. As such, it is contemplated to provide the frequency shifting to fewer than all of the regulators or alternatively to provide this function on all regulators. The illustrated synchronization sensor is formed of individual components in some embodiments. However, this function may be provided by an integrated circuit, which may be a stand alone circuit or incorporated into an integrated circuit that also performs other functions.

Embodiments of the invention provide that the synchronization pulse detection is performed for each regulator and is included within or associated with the regulator. This permits the regulators to be provided as stand alone units, as a commodity item. Alternative embodiments provide that the synchronization pulse detection for a multi-regulator power supply is provided by a single synchronization detector with its output connected to each regulator. Combinations of these two alternatives may also be provided wherein fewer synchronization pulse detectors are provided than regulators.

The synchronization signal is shown as a pulse. It is foreseen that signals other than pulses may be used for synchronization of the regulators with one another.

Although other modifications and changes may be suggested by those skilled in the art, it is the intention of the inventors to embody within the patent warranted hereon all changes and modifications as reasonably and properly come within the scope of their contribution to the art.

We claim:

1. A power regulator, comprising:
   an oscillator having a frequency setting input and having an output for producing an oscillator signal;
   a synchronization signal input connected to said oscillator;
   a synchronization signal detector connected to change a condition of said frequency setting input depending upon a presence of a synchronization signal at said synchronization signal input, said change in said condition of said frequency setting input resulting in a change in an output frequency of said oscillator.

2. A power regulator as claimed in claim 1, wherein said synchronization signal detector includes a switch element to selectively change a condition at said frequency setting input.

3. A power regulator as claimed in claim 2, further comprising:
   a resistive element connected to said switch element., said resistive element being applied to said frequency setting input depending upon a presence of the synchronization signal at said synchronization signal input.

4. A power regulator as claimed in claim 2, further comprising:
A capacitive element connected to said switch element, said capacitive element being applied to said frequency setting input depending upon a presence of the synchronization signal at said synchronization signal input.

5. A power regulator for generating a regulated output voltage, comprising:
a power conversion stage having a power input connected to receive an input signal and having an output at which a regulated output voltage is produced, said power conversion stage having a control input;
a feedback loop having an input connected to said output of said power conversion stage, said feedback loop having an output connected to said control input of said power conversion stage;
a controller connected in said feedback loop, said controller having a frequency setting input and a synchronization input;
a switch connected to said frequency setting input of said controller, said switch being connected to change a condition at said frequency setting input depending upon a presence of a synchronization signal at said synchronization input.

6. A power regulator as claimed in claim 5, wherein said controller includes:
an oscillator having an input connected to said a frequency setting input and an input connected to said synchronization input, said oscillator having an oscillator output, said oscillator operating to generate a lower frequency oscillator signal upon said switch being changed to a condition to indicate a presence of a synchronization signal;
a ramp generator connected to said oscillator output, said ramp generator having a ramp signal output; and
a pulse width modulator having an input connected to said ramp signal output, said pulse width modulator having an output connected to said control input of said power conversion stage.

7. A power regulator as claimed in claim 5, further comprising:
an impedance element connected to be selectively connected to said frequency setting input of said controller by operation of said switch.

8. A power regulator as claimed in claim 7, wherein said impedance element is a resistor.

9. A power regulator as claimed in claim 7, wherein said impedance element is a capacitor.

10. A power regulator as claimed in claim 5, wherein said switch is a transistor.

11. A method for synchronizing switching frequencies of power regulators, comprising the steps of:
generating a plurality of output voltages by a plurality of switching regulators, said switching regulators having switching signals;
synchronizing said switching regulators with one another with a synchronization signal;
detecting a presence of said synchronization signal; and
setting said switching signals to a lower frequency upon detection of said synchronization signal.

12. A method as claimed in claim 11, wherein said step of detecting the presence of said synchronization signal is performed for each of said plurality of switching regulators.

13. A power supply for generation of a plurality of regulated power levels, comprising:
a plurality of power regulators each connected to receive an input power signal and operable to generate the regulated power levels, each of said power regulators including a synchronization signal input, each of said power regulators having a frequency setting input;
said synchronization inputs of said power regulators connected together to receive a synchronization signal; and
a synchronization signal detector having an input connected to receive said synchronization signal, said synchronization signal detector having an output connected to said frequency setting input of at least one of said plurality of power regulators.

14. A power supply as claimed in claim 13, further comprising:
a synchronization signal detector connected to each of said plurality of power regulators.

15. A power supply as claimed in claim 13, further comprising:
a switch connected to the frequency setting input of at least one of said power regulators, said switch being connected to said synchronization signal detector so as to change said switch to a detect position upon said synchronization signal being detected by said synchronization signal detector, said detect position of said switch changing a frequency of said at least one of said power regulators.

16. A power supply as claimed in claim 13, wherein said synchronization signal detector includes at least one logic gate.

17. A power supply as claimed in claim 15, wherein said switch connects to an impedance element selectively applied to said frequency setting input depending upon a presence of said synchronization signal.

18. A power supply as claimed in claim 13, wherein each of said power regulators are switching power regulators.

* * * * *